(12) United States Patent
Shibata

(10) Patent No.: US 10,421,419 B2
(45) Date of Patent: Sep. 24, 2019

(54) ELECTRONIC CONTROL DEVICE FOR VEHICLES

(71) Applicant: DENSO CORPORATION, Kariya, Aichi-pref. (JP)

(72) Inventor: Hiroaki Shibata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 63 days.

(21) Appl. No.: 15/743,971

(22) PCT Filed: Jul. 5, 2016

(86) PCT No.: PCT/JP2016/069846
§ 371 (c)(1),
(2) Date: Jan. 11, 2018

(87) PCT Pub. No.: WO2017/033579
PCT Pub. Date: Mar. 2, 2017

(65) Prior Publication Data
US 2018/0208136 A1    Jul. 26, 2018

(30) Foreign Application Priority Data
Aug. 24, 2015 (JP) ................. 2015-164726

(51) Int. Cl.
*B60R 16/023* (2006.01)
*G06F 16/903* (2019.01)
(Continued)

(52) U.S. Cl.
CPC ........ *B60R 16/0232* (2013.01); *G06F 16/903* (2019.01); *G06Q 40/08* (2013.01);
(Continued)

(58) Field of Classification Search
CPC combination set(s) only.
See application file for complete search history.

(56) References Cited

U.S. PATENT DOCUMENTS 5,701,121 A * 12/1997 Murdoch .............. B61L 23/005
340/10.34
6,195,602 B1 * 2/2001 Hazama ................ G07C 5/008
701/29.6
(Continued)

FOREIGN PATENT DOCUMENTS

JP    3758356 B2    3/2006
JP    5206737 B2    6/2013

*Primary Examiner* — Redhwan K Mawari
(74) *Attorney, Agent, or Firm* — Harness, Dickey & Pierce, P.L.C.

(57) ABSTRACT

A vehicle electronic control device includes: a detection unit of a power supply voltage; a power determination unit determining whether the power supply voltage is reduced below a predetermined voltage; an identification number storage unit for a vehicle identification number; a timing storage unit storing time information of reduction when the power supply voltage is reduced below the predetermined voltage; a control unit acquiring a vehicle identification number stored in an identification number storage unit and time information stored in a timing storage unit of the other electronic control device; and an identification number determination unit: determining one of the other electronic control device and the electronic control device storing newest time information in the timing storage unit as a target electronic control device; and determining that a vehicle identification number stored in the identification number storage unit of the target electronic control device is a correct identification number.

4 Claims, 5 Drawing Sheets

(51) Int. Cl.
*G06Q 40/08* (2012.01)
*G07C 5/00* (2006.01)
*G07C 5/08* (2006.01)
*G01M 17/007* (2006.01)
*B60R 21/00* (2006.01)

(52) U.S. Cl.
CPC .......... *G07C 5/008* (2013.01); *G07C 5/0841* (2013.01); *B60R 2021/0027* (2013.01); *G01M 17/007* (2013.01)

(56) References Cited

U.S. PATENT DOCUMENTS

| | | | | |
|---|---|---|---|---|
| 9,185,526 B2* | 11/2015 | Guba | | G08G 1/20 |
| 2007/0126561 A1* | 6/2007 | Breed | | B60K 28/066 |
| | | | | 340/426.13 |
| 2007/0139216 A1* | 6/2007 | Breed | | G08C 17/00 |
| | | | | 340/13.24 |
| 2007/0285256 A1* | 12/2007 | Batra | | G01M 5/00 |
| | | | | 340/572.8 |
| 2008/0018466 A1* | 1/2008 | Batra | | G06K 19/0702 |
| | | | | 340/572.1 |
| 2008/0065290 A1* | 3/2008 | Breed | | G01L 17/00 |
| | | | | 701/31.4 |
| 2008/0216567 A1* | 9/2008 | Breed | | B60C 11/24 |
| | | | | 73/146.5 |
| 2011/0304448 A1* | 12/2011 | Kawamura | | G07C 5/0808 |
| | | | | 340/438 |
| 2012/0089299 A1* | 4/2012 | Breed | | B60C 11/24 |
| | | | | 701/36 |
| 2013/0332488 A1* | 12/2013 | Christy | | G06Q 30/01 |
| | | | | 707/781 |
| 2015/0052022 A1* | 2/2015 | Christy | | G06Q 30/01 |
| | | | | 705/26.63 |

* cited by examiner

ELECTRONIC CONTROL DEVICE FOR VEHICLES

CROSS REFERENCE TO RELATED APPLICATIONS

This application is a U.S. National Phase Application under 35 U.S.C. 371 of International Application No. PCT/JP2016/069846 filed on Jul. 5, 2016 and published in Japanese as WO 2017/033579 A1 on Mar. 2, 2017. This application is based on and claims the benefit of priority from Japanese Patent Application No. 2015-164726 filed on Aug. 24, 2015. The entire disclosures of all of the above applications are incorporated herein by reference.

TECHNICAL FIELD

The present disclosure relates to a vehicle electronic control device that stores an identification number therein.

BACKGROUND ART

A plurality of vehicle electronic control devices are connected inside a vehicle and operate in cooperation with each other. Further, a predetermined electronic control device stores a vehicle identification number (VIN code) unique to the vehicle. For example, when a vehicle accident occurs, the electronic control device transmits the vehicle identification number to a public safety answering point (PSAP) which is located outside. For example, Patent Literature 1 relates to the present application.

On the other hand, for example, when a vehicle trouble occurs, and any of electronic control devices which register the vehicle identification number is replaced in a car dealer or the like, a vehicle identification number mismatch may occur, and the electronic control devices may store different identification numbers. In such a case, when the above technique for communicating with PSAP is applied, for example, an incorrect vehicle identification number may be notified to PSAP at the time of a vehicle collision.

Thus, as with the technique described in Patent Literature 1, there is a method in which a majority decision is made between vehicle identification numbers stored in a plurality of electronic control devices, and a majority code is determined to be a correct identification number when the majority code is the same as the majority of the vehicle identification numbers. However, there is no positive proof that the majority code is a correct vehicle identification number. Thus, there is requested a technique for identifying the vehicle identification number as accurately as possible in such a case.

PRIOR ART LITERATURES

Patent Literature

Patent Literature 1: JP-3758356-B1

SUMMARY

It is an object of the present disclosure to provide an electronic control device that is used in a system capable of identifying an electronic control device that stores a correct vehicle identification number therein even if any one or more of a plurality of electronic control devices are replaced.

According to a first aspect of the present disclosure, a vehicle electronic control device that is connected to an other electronic control device to constitute a system, includes: a detection unit that detects a power supply voltage supplied to a body of the electronic control device; a power determination unit that determines whether the power supply voltage detected by the detection unit is reduced below a predetermined voltage; an identification number storage unit that stores a vehicle identification number; a timing storage unit that stores time information of reduction in a nonvolatile manner when the power determination unit determines that the power supply voltage is reduced below the predetermined voltage; a control unit that acquires a vehicle identification number stored in an identification number storage unit of the other electronic control device and time information stored in a timing storage unit of the other electronic control device through a vehicle network; and an identification number determination unit that: determines one of the other electronic control device and the electronic control device as a target electronic control device when the timing storage unit of each of the other electronic control device and the electronic control device stores the time information, the one of the other electronic control device and the electronic control device storing newest time information in the timing storage unit; and determines that a vehicle identification number stored in the identification number storage unit of the target electronic control device is a correct identification number.

The above electronic control device assumes that, when any one or more of a plurality of electronic control devices are replaced, the electronic control device(s) is/are replaced with the supply of power supply voltage stopped. In this case, time information is written into the timing storage unit of each of the connected electronic control devices. Time information is also written into a timing storage unit of a newly replaced electronic control device. However, the new electronic control device is previously prepared prior to the replacement process, and the time information is thus sufficiently earlier than the replacement timing. That is, the time information stored in the timing storage unit of the newly replaced electronic control device is time information at the timing earlier than the timing when the supply of power supply voltage to the connected electronic control devices is stopped. Thus, the identification number determination unit determines that the electronic control device that stores therein the newest one of the pieces of time information stored in the timing storage units of the electronic control devices is the target electronic control device and determines that the vehicle identification number stored in the identification number storage unit of the target electronic control device is the correct identification number. Accordingly, it is possible to identify the electronic control device that stores the correct vehicle identification number therein.

According to a second aspect of the present disclosure, a vehicle electronic control device that is connected to an other electronic control device to constitute a system, includes: a detection unit that detects a power supply voltage supplied to a body of the electronic control device; a power determination unit that determines whether the power supply voltage detected by the detection unit is reduced below a predetermined voltage; an identification number storage unit that stores a vehicle identification number; a determination result storage unit that stores a determination result of the power determination unit; a control unit that acquires a vehicle identification number stored in an identification number storage unit of the other electronic control device through a vehicle network; and an identification number determination unit that: determines one of the other electronic control device and the electronic control device a target electronic control device, the one of the other electronic control device and the electronic control device storing information, in the determination result storage unit, indicating that the power supply voltage is not reduced below the predetermined voltage; and determines that a vehicle identification number stored in the identification number storage unit of the target electronic control device is a correct identification number.

The above electronic control device assumes that the electronic control device is replaced without stopping the supply of power supply voltage. When one or more of a plurality of electronic control devices is/are replaced as replacement target electronic control device(s) without stopping the supply of power supply voltage, the determination storage unit of the electronic control device other than the replacement target electronic control device(s) stores therein that the power supply voltage is equal to or higher than the predetermined voltage. Thus, the identification number determination unit determines that the electronic control device that stores that the power supply voltage is equal to or higher than the predetermined voltage in the determination result storage unit is the target electronic control device and determines that the vehicle identification number stored in the identification number storage unit of the target electronic control device is the correct identification number. Accordingly, it is possible to identify the electronic control device that stores the correct vehicle identification number therein.

Alternatively, the vehicle electronic control device may further includes: a rewriting unit that writes the vehicle identification number, determined by the identification number determination unit as the correct identification number, into the identification number storage unit of an other of the other electronic control device and the electronic control device different from the target electronic control device. In this case, the rewriting unit writes the vehicle identification number that is determined to be the correct identification number by the identification number determination unit into an identification number storage unit of another electronic control device that differs from the target electronic control device. Thus, it is possible to prevent different identification numbers from being stored in a plurality of electronic control devices.

BRIEF DESCRIPTION OF DRAWINGS

The above and other objects, features and advantages of the present disclosure will become more apparent from the following detailed description made with reference to the accompanying drawings. In the drawings:

EMBODIMENTS (First Embodiment)
FIGS. 1 to 5 are explanatory diagrams of a first embodiment. FIG. 1 is a schematic block diagram illustrating an electric configuration example of a vehicle system 1. A center 2 which serves as a supervision office is installed outside a vehicle. The center 2 is a public safety answering point (PSAP) which wirelessly receives an emergency call from a vehicle.

On the other hand, various vehicle electronic control devices (each corresponding to an electronic control device body) including an ECU 3 for electric fuel injection (EFI) (hereinbelow, referred to as the EFI 3) and a telematics control unit (TCU) 4 are connected inside the vehicle (e.g., a motor vehicle) through a vehicle network 5 such as a CAN.

Figure 1:
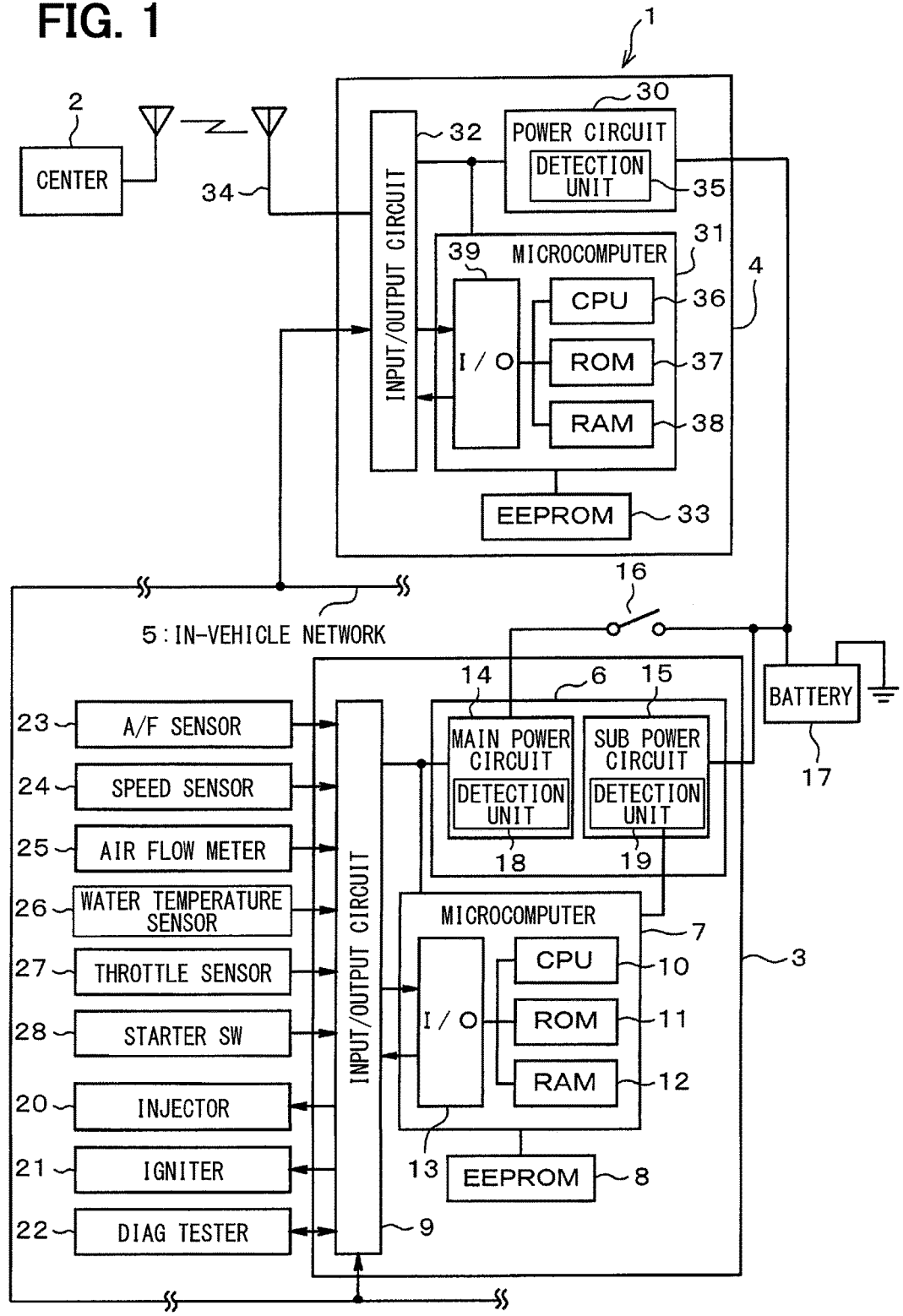
FIG. 1 is a block diagram schematically illustrating a connection form between a plurality of electronic control devices in a first embodiment.

As illustrated in FIG. 1, the EFI 3 includes a power circuit 6, a microcomputer 7, an EEPROM 8, and an input/output circuit 9 which are connected to each other and controls various sensors and an actuator inside the vehicle. The microcomputer 7 is provided with a CPU 10, a ROM 11, a RAM 12, and an I/O 13, and the EEPROM 8 as a storage device is connected to the microcomputer 7.

The power circuit 6 is provided with a main power circuit 14 and a sub power circuit 15. In EFI 3, the main power circuit 14 is connected to a battery 17 through a key switch 16. The EFI 3 basically operates when the key switch 16 is switched to ON so that power is supplied from the main power circuit 14. Further, the EFI 3 is also provided with the sub power circuit 15 which is directly connected to the battery 17 without through the key switch 16. Thus, data held by the microcomputer 7 can be held also after the key switch 16 is turned off by supplying power to the microcomputer 7 from the sub power circuit 15. For example, the main power circuit 14 and the sub power circuit 15 are respectively provided with detection units 18, 19 which are capable of detecting voltage of the battery 17.

The microcomputer 7 outputs a signal that controls an injector 20 and an igniter 21 for the operation of an engine on the basis of a sensor signal that is input by the CPU 10 through the I/O 13 on the basis of a control program stored in the ROM 11. Further, the microcomputer 7 functions as a power determination unit, a control unit, an identification number determination unit, and a rewriting unit by the CPU 10 performing the following processing on the basis of the control program stored in the ROM 11. Further, a DIAG tester 22 is connectable to the microcomputer 7 through the input/output circuit 9. The microcomputer 7 performs self-diagnosis of an abnormality relating to an emission of the engine, diagnoses abnormalities of the operation of the engine and the sensors, and outputs a result of the diagnosis in response to a request from the outside. Further, the RAM 12 inside the microcomputer 7 holds sensor data which is used in arithmetic processing in the CPU 10, control data which is calculated in an operation, and various diagnosis data items which are obtained in diagnosis processing. Further, examples of the sensors connected to the input/output circuit 9 include an air-fuel ratio (A/F) sensor 23, a speed sensor 24 which detects an engine speed, an air flow meter 25, a water temperature sensor 26, a throttle sensor 27, and a starter switch 28.

The EEPROM 8 of the EFI 3 is provided with an area that stores, in a nonvolatile manner, data such as a vehicle identification information VIN and time information. The EEPROM 8 is used as an identification number storage unit, a timing storage unit, and a determination result storage unit. The vehicle identification number VIN is unique to an individual EFI and written, in a nonvolatile manner, into the EEPROM 8 during manufacture of the EFI 3. Further, the microcomputer 7 of the EFI 3 has a clocking function, that is, a function of measuring time such as the current time.

The TCU 4 is used as, for example, an emergency communication unit and provided for making a report to the center 2 which is installed outside, for example, when a vehicle collision occurs. The TCU 4 is provided with, for example, a power circuit 30, a microcomputer 31, an input/output circuit 32, an EEPROM 33, and an antenna 34. The power circuit 30 is provided for supplying power for operation to the TCU 4 and provided with, for example, a detection unit 35 which is capable of detecting voltage of the battery 17.

Power is constantly supplied to the power circuit 30 from the battery 17 so that the power circuit 30 operates regardless of a state of the key switch 16 of the vehicle. Further, the microcomputer 31 is provided with a CPU 36, a ROM 37, a RAM 38, and an I/O 39 and executes processing corresponding to a request from the outside through the antenna 34 on the basis of a control program stored in the ROM 37. The microcomputer 31 functions as the power determination unit, the control unit, the identification number determination unit, and the rewriting unit by executing the following processing on the basis of the control program stored in the ROM 37. Further, the RAM 38 inside the microcomputer 31 temporarily stores therein data transmitted from another electronic control device such as the EFI 3.

Further, the input/output circuit 32 is connected to the antenna 34 and the vehicle network 5. Data that is input and output through the input/output circuit 32 can be transmitted to and received from the CPU 36 through the I/O 39 of the microcomputer 31. The EEPROM 33 is also provided with an area that stores data such as the vehicle identification information VIN and time information and used as a storage unit that stores, in a nonvolatile manner, the data. The EEPROM 33 is used as the identification number storage unit, the timing storage unit, and the determination result storage unit. Further, the microcomputer 31 of the TCU 4 has a clocking function, that is, a function of measuring time such as the current time.

The identification number VIN is also stored in the EEPROM 33 for a service provider for, for example, vehicle management service of finance & insurance (F&I) to execute a vehicle management service such as billing. The vehicle identification number VIN is registered in the EFI 3 at first. The EFI 3 transmits the vehicle identification number VIN to the TCU 4 through the vehicle network 5, and the microcomputer 31 of the TCU 4 writes the vehicle identification number VIN into the EEPROM 33 inside thereof. Accordingly, the vehicle identification numbers VIN stored in the EEPROMs 8, 33 of the EFI 3 and the TCU 4 can match.

However, for example, when a vehicle dealer fails to update the identification number VIN in replacement of the EFI 3 or the TCU 4, identification numbers VIN stored in the EFI 3 and the TCU 4 may not match. In such a case, it may not be possible to determine which of the identification numbers VIN stored in the EFI 3 and the TCU 4 is a correct identification number. Thus, in the present embodiment, as described below, which of the identification numbers VIN is correct is determined by automatic processing by the EFI 3 (or the TCU 4), and rewriting is further performed so as to prevent a mismatch.

Figure 2:
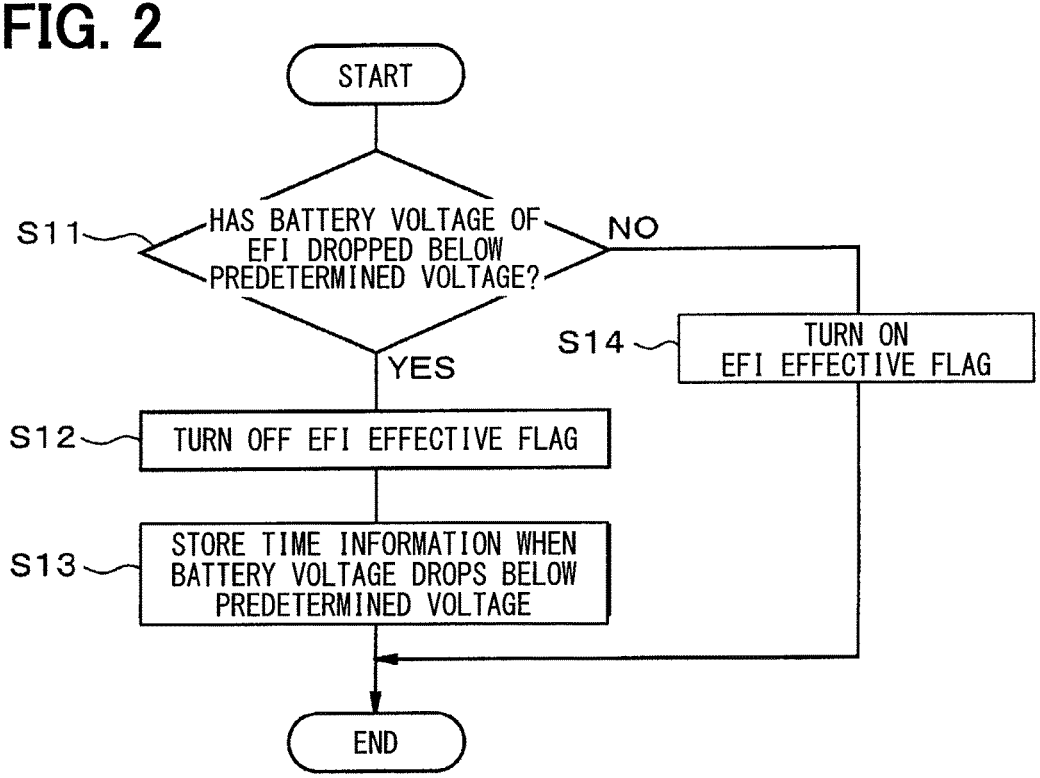
FIG. 2 is a flowchart (1) schematically illustrating an operation.

The EFI 3 constantly performs processing illustrated in FIG. 2. The main power circuit 14 and the sub power circuit 15 of the EFI 3 input voltage of the battery 17 supplied to the EFI 3. When voltage of the battery 17 is applied, the detection units 18, 19 detect the voltage of the battery 17.

When the detection unit 19 of the sub power circuit 15 detects that the voltage of the battery 17 has dropped below a predetermined voltage, an EFI effective flag is turned off (S12). On the other hand, when the detection unit 19 of the sub power circuit 15 detects no voltage drop in the battery 17, the microcomputer 31 turns on the EFI effective flag without storing time information in the EEPROM 8 (S14).

The EFI effective flag is, for example, flag information stored in the EEPROM 8 or the RAM 12 inside the EFI 3. The EFI effective flag is a flag for determining whether the identification sign VIN stored in the EEPROM 8 of the EFI 3 is assured and effectively referable. If the EFI effective flag is stored as ON, the flag indicates that the identification sign VIN stored in the EEPROM 8 is considered and determined to be correct.

Figure 3:
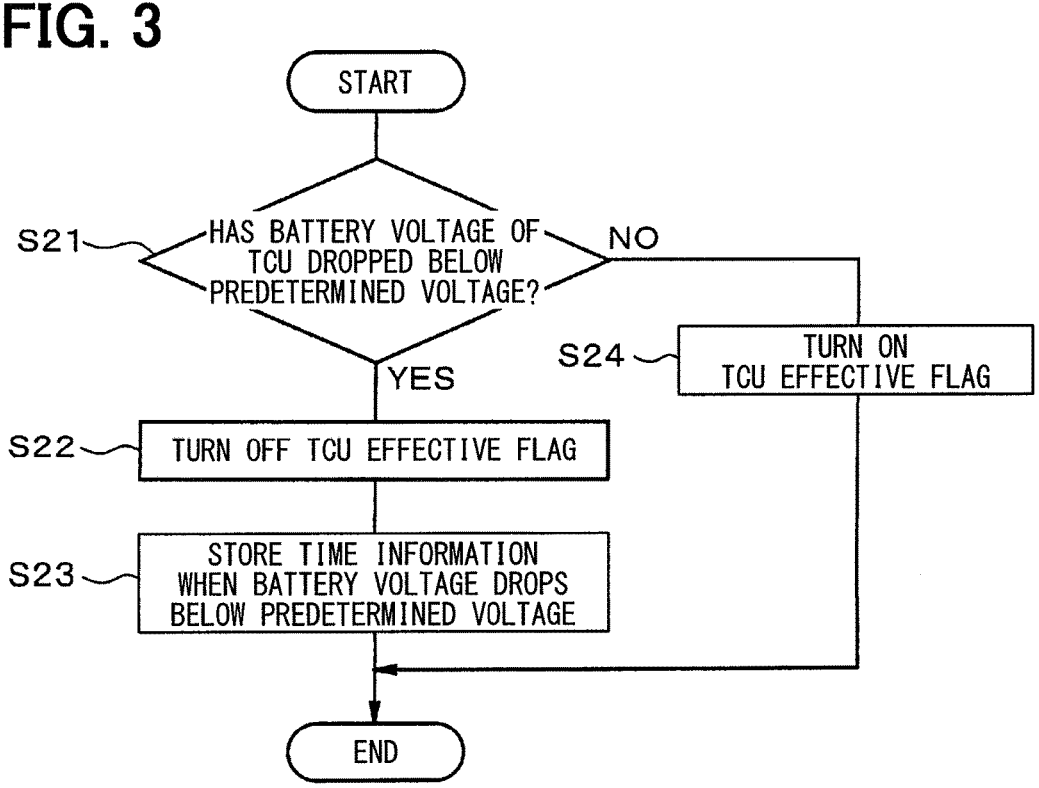
FIG. 3 is a flowchart (2) schematically illustrating an operation.

On the other hand, the TCU 4 constantly performs processing illustrated in FIG. 3. The power circuit 30 of the TCU 4 inputs voltage of the battery 17 supplied to the TCU 4. When voltage of the battery 17 is applied, the detection unit 35 detects the voltage of the battery 17. When the detection unit 35 of the power circuit 30 detects that the voltage of the battery 17 has dropped below a predetermined voltage, a TCU effective flag is turned off (S22). On the other hand, when the detection unit 35 of the power circuit 30 detects no voltage drop in the battery 17, the microcomputer 31 turns on the TCU effective flag without storing time information in the EEPROM 33 (S24).

The TCU effective flag is, for example, flag information stored in the EEPROM 33 or the RAM 38 inside the TCU 4. The TCU effective flag is a flag for determining whether the identification sign VIN stored in the EEPROM 33 of the TCU4 is assured and effectively referable. If the TCU effective flag is stored as ON, the flag indicates that the identification sign VIN stored in the EEPROM 33 is considered and determined to be correct.

Figure 4:
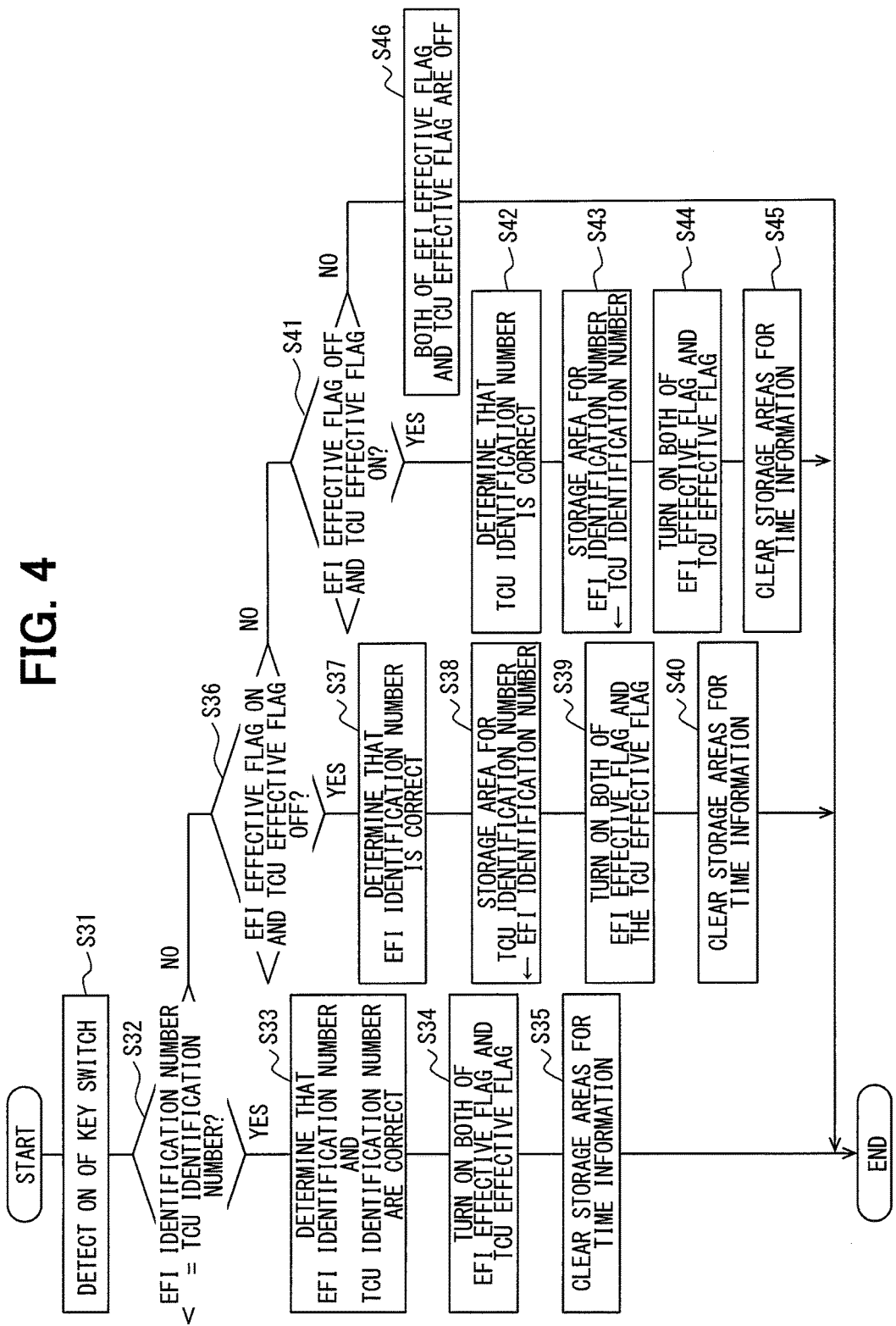
FIG. 4 is a flowchart (3) schematically illustrating an operation.
Figure 5:
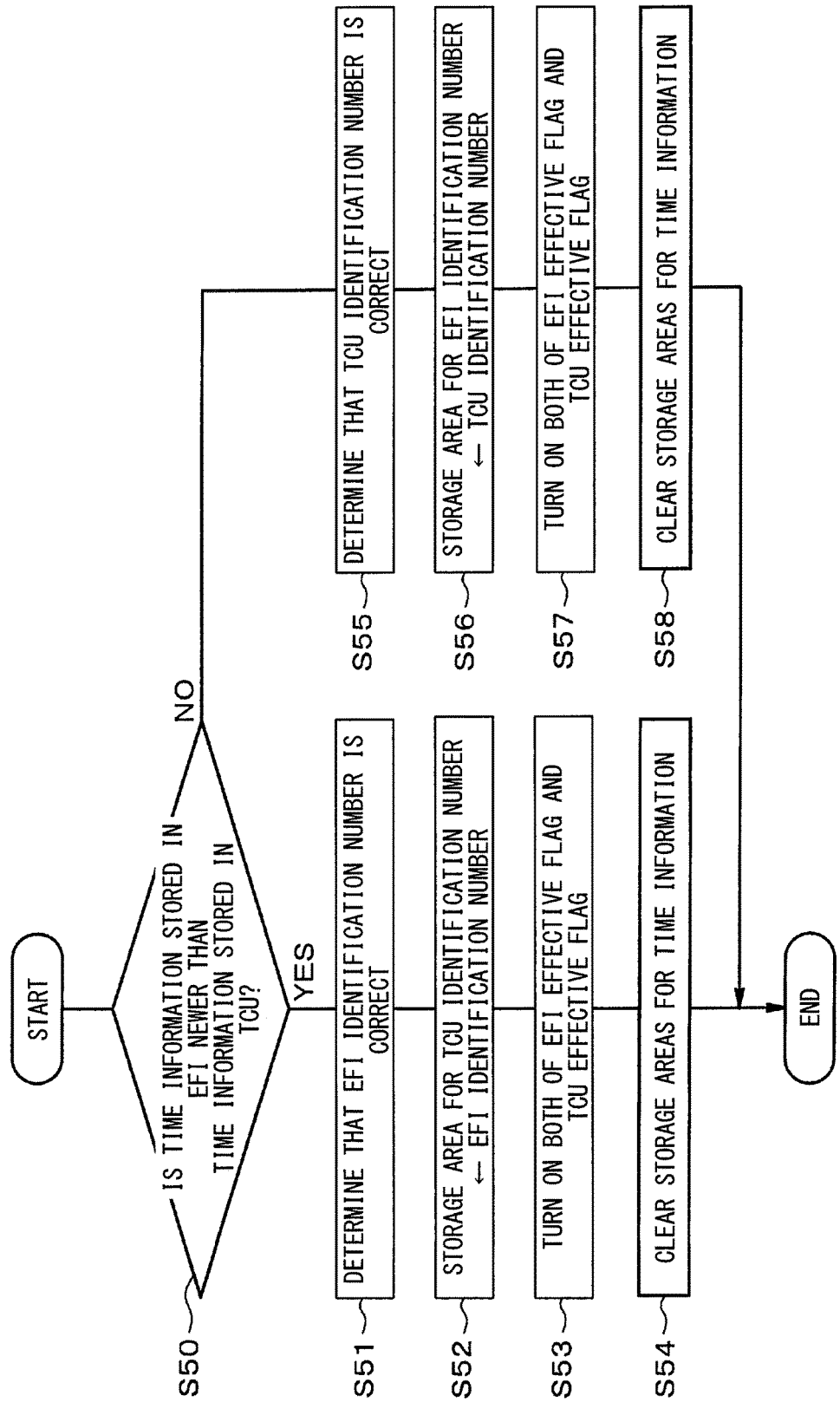
FIG. 5 is a flowchart (4) schematically illustrating an operation.

While the EFI 3 and the TCU 4 execute the processing illustrated in FIG. 2 and the processing illustrated in FIG. 3, respectively, the microcomputer 7 of the EFI 3 or the microcomputer 31 of the TCU 4 executes processing illustrated in FIG. 4 and processing illustrated in FIG. 5. The processing illustrated in FIG. 4 and the processing illustrated in FIG. 5 may be executed by either the microcomputer 7 of the EFI 3 or the microcomputer 31 of the TCU 4. However, another electronic control device (not illustrated) connected to the vehicle network 5 may execute the processing illustrated in FIG. 4 and the processing illustrated in FIG. 5. The following description will be made assuming that the microcomputer 7 of the EFI 3 executes the processing illustrated in FIG. 4 and the processing illustrated in FIG. 5.

After detection of ON of the key switch 16, the microcomputer 7 of the EFI 3 first determines whether an EFI identification number and a TCU identification number which are stored in the EEPROMs 8, 33 of the EFI 3 and the TCU 4 match (S32). When this determination process is performed, the microcomputer 7 of the EFI 3 acquires the TCU identification number from the EEPROM 33 of the TCU 4 through the vehicle network 5 in cooperation with the microcomputer 31 of the TCU 4 and compares the acquired TCU identification number with the EFI identification number stored in the EEPROM 8 of the EFI 3.

When the microcomputer 7 determines that the EFI identification sign and the TCU identification sign match, the microcomputer 7 determines that these identification numbers are correct (S33), turns on both of the EFI effective flag and the TCU effective flag (S34), and clears the storage areas for time information in the EEPROMs 8, 33 (S35).

Further, the microcomputer 7 of the EFI 3 determines whether the EFI effective flag is ON and the TCU effective flag is OFF (S36). When this condition is satisfied, the microcomputer 7 determines that the EFI identification number is correct (S37), writes the contents of a storage area for the EFI identification number into a storage area for the TCU identification number (S38), turns on both of the EFI effective flag and the TCU effective flag (S39), and clears the storage areas for time information in the EEPROMs 8, 33 (S40).

Further, the microcomputer 7 of the EFI 3 determines whether the EFI effective flag is OFF and the TCU effective flag is ON (S41). When this condition is satisfied, the microcomputer 7 determines that the TCU identification number is correct (S42), writes the contents of the storage area for the TCU identification number into the storage area for the EFI identification number (S43), turns on both of the EFI effective flag and the TCU effective flag (S44), and clears the storage areas for time information in the EEPROMs 8, 33 (S45).

When all the conditions of steps S32, S36, S41 are not satisfied, the microcomputer 7 of the EFI 3 considers that both of the EFI effective flag and the TCU effective flag are OFF (S46) and executes the processing illustrated in FIG. 5 in this case.

When both of the EFI effective flag and the TCU effective flag are OFF in this manner, time information is stored in each of the EEPROMs 8, 33 of the EFI 3 and the TCU 4. Thus, the microcomputer 7 of the EFI 3 determines whether time information stored in the EEPROM 8 of the EFI 3 (hereinbelow, referred to as the time information of the EFI) is newer than time information stored in the EEPROM 33 of the TCU 4 (hereinbelow, referred to as the time information of the TCU) (S50). If the time information of the EFI 3 is newer than the time information of the TCU 4, the microcomputer 7 of the EFI 3 determines YES in step S50 and determines that the EFI identification number is correct (S51). Then, the microcomputer 7 of the EFI 3 writes the contents of the storage area for the EFI identification number into the storage area for the TCU identification number (S52), turns on both of the EFI effective flag and the TCU effective flag (S53), and clears the storage areas for time information in the EEPROMs 8, 33 (S54).

On the other hand, when the time information of the TCU 4 is newer than the time information of the EFI 3, the microcomputer 7 of the EFI 3 determines NO in step S50 and determines that the TCU identification number is correct (S55). Then, the microcomputer 7 of the EFI 3 writes the contents of the storage area for the TCU identification number into the storage area for the EFI identification number (S56), turns on both of the EFI effective flag and the TCU effective flag (S57), and clears the storage areas for time information in the EEPROMs 8, 33 (S58). Accordingly, it is possible to identify a target electronic control device that stores the correct identification number VIN therein, that is, the EFI 3 or the TCU 4 and, further, possible to write the correct identification number VIN into the storage area for the identification number of another electronic control device.

Hereinbelow, description will be made with concrete examples.

<Case of Abnormality Found in EFI>

For example, description will be made assuming a case in which a vehicle dealer finds any abnormality in the EFI 3 and replaces the EFI 3 (hereinbelow, referred to as the "own-vehicle EFI 3"). In the configuration illustrated in FIG. 1, the EFI 3 can be replaced without stopping power supply to the TCU 4.

Further, description will be made assuming that an electronic control device that is newly replaced is mounted on another used vehicle. The electronic control device (hereinbelow, referred to as the "other-vehicle EFI 3") has a configuration similar to the configuration of the own-vehicle EFI 3. An EFI identification number that differs from an EFI identification number written in the EEPROM 8 of the own-vehicle EFI 3 is written in the EEPROM 8 of the other-vehicle EFI 3.

For example, when an operator of the vehicle dealer removes the own-vehicle EFI 3 from the battery 17 without stopping power supply to the TCU 4, the supply of power supply voltage to the EFI 3 is stopped. At this time, both of the main power circuit 14 and the sub power circuit 15 detect a voltage drop in the battery 17 by the detection units 18, 19, and the microcomputer 7 writes time information into the EEPROM 8 (S13).

On the other hand, when the other-vehicle EFI 3 is removed from the other vehicle, information indicating that the EFI effective flag is OFF is also written into the EEPROM 8 of the other-vehicle EFI 3 (S12). Further, time information at the timing when the other-vehicle EFI 3 is removed from the other vehicle and the supply of power supply voltage is stopped is written into the EEPROM 8 of the other-vehicle EFI 3 (S13). Power supply to the TCU 4 is continued. Thus, the TCU effective flag remains ON (S24).

For example, when the microcomputer 7 of the EFI 3 executes the processing illustrated in FIG. 4, the microcomputer 7 determines that the EFI effective flag is OFF and the TCU effective flag is ON (YES in S41) and determines that the TCU identification number is correct (S42). Then, the microcomputer 7 writes the TCU identification number into the storage area for the EFI identification number (S43). Accordingly, it is possible to determine that the TCU identification number written in the EEPROM 33 of the TCU 4 is correct and identify the TCU 4 as the target electronic control device that stores the correct vehicle identification number VIN therein. Further, it is possible to write the TCU identification number written in the EEPROM 33 of the TCU 4 into the EFI 3 replaced from the other vehicle as the EFI identification number. Accordingly, even when the own-vehicle EFI 3 is replaced with the other-vehicle EFI 3, it is possible to correctly rewrite the vehicle identification number VIN.

<Case of Abnormality Found in TCU>

For example, description will be made assuming a case in which a vehicle dealer finds any abnormality in the TCU 4 and replaces the TCU 4 (hereinbelow, referred to as the own-vehicle TCU 4). In the configuration illustrated in FIG. 1, the TCU 4 can be replaced without stopping power supply to the EFI 3.

Further, description will be made assuming that an electronic control device that is newly replaced is mounted on another used vehicle. The electronic control device (hereinbelow, referred to as the other-vehicle TCU 4) has a configuration similar to the configuration of the own-vehicle TCU 4. A TCU identification number that differs from a TCU identification number written in the EEPROM 33 of the own-vehicle TCU 4 is written in the EEPROM 33 of the other-vehicle TCU 4.

For example, when an operator of the vehicle dealer removes the own-vehicle TCU 4 from the battery 17 without stopping power supply to the EFI 3, the supply of power supply voltage to the TCU 4 is stopped. At this time, both of the main power circuit 14 and the sub power circuit 15 detect a voltage drop in the battery 17 by the detection units 18, 19, and the microcomputer 7 writes time information into the EEPROM 8 (S23).

When the other-vehicle TCU 4 is removed from the other vehicle, information indicating that the TCU effective flag is OFF is also written into the EEPROM 33 of the other-vehicle TCU 4 (S22). Further, time information at the timing when the other-vehicle TCU 4 is removed from the other vehicle and the supply of power supply voltage is stopped is written into the EEPROM 33 of the other-vehicle TCU 4 (S23). Power supply to the EFI 3 is continued. Thus, the EFI effective flag remains ON (S14).

For example, when the microcomputer 7 of the EFI 3 executes the processing illustrated in FIG. 4, the microcomputer 7 determines that the EFI effective flag is ON and the TCU effective flag is OFF (YES in S36) and determines that the EFI identification number is correct (S37). Then, the microcomputer 7 writes the EFI identification number into the storage area for the TCU identification number of the EEPROM 33 in cooperation with the microcomputer 31 (S38). Accordingly, it is possible to determine that the EFI identification number written in the EEPROM 8 of the EFI 3 is correct and identify the EFI 3 as the target electronic control device that stores the correct vehicle identification number therein. Further, it is possible to write the EFI identification number into the TCU 4 replaced from the other vehicle as the TCU identification number. Accordingly, even when the own-vehicle TCU 4 is replaced with the other-vehicle TCU 4, it is possible to correctly rewrite the vehicle identification number VIN.

<Case of Replacement of EFI 3 with Power Supply to EFI 3, TCU 4 Stopped>

For example, description will be made assuming a case in which a vehicle dealer finds any abnormality in the EFI 3 and replaces the EFI 3 (hereinbelow, referred to as the own-vehicle EFI 3). At this time, in the configuration illustrated in FIG. 1, the battery 17 may be removed from the EFI 3 and TCU 4, and only the EFI 3 may be replaced while using the TCU 4 as it is.

In a manner similar to the above, description will be made assuming that an electronic control device that is newly replaced is mounted on another used vehicle. The electronic control device (hereinbelow, referred to as the other-vehicle EFI 3) has a configuration similar to the configuration of the own-vehicle EFI 3. An EFI identification number that differs from an EFI identification number written in the EEPROM 8 of the own-vehicle EFI 3 is written in the other-vehicle EFI 3.

For example, when an operator of the vehicle dealer stops power supply to the EFI 3 and the TCU 4 and removes the own-vehicle EFI 3 from the battery 17, the supply of power supply voltage to both of the EFI 3 and TCU 4 is stopped. At this time, both of the power circuits 6, 30 of the EFI 3 and the TCU 4 detect a drop in the battery voltage by the detection units 18, 19, 35, and the microcomputers 7, 31 write time information into the EEPROMs 8, 33, respectively (S13, S23).

On the other hand, when the other-vehicle EFI 3 is removed from the other vehicle, information indicating that the EFI effective flag is OFF is also written into the EEPROM 8 of the other-vehicle EFI 3 (S12). Further, time information at the timing when the other-vehicle EFI 3 is removed from the other vehicle and the supply of power supply voltage is stopped is written in the EEPROM 8 of the other-vehicle EFI 3 (S13). Power supply to the TCU 4 is also stopped. Thus, the TCU effective flag is OFF (S22).

For example, when the microcomputer 7 of the EFI 3 executes the processing illustrated in FIG. 4, the microcomputer 7 determines that the EFI effective flag is OFF and the TCU effective flag is OFF (YES in S46), executes the processing illustrated in FIG. 5, and determines whether time information stored in the EFI 3 is newer than time information stored in the TCU 4 (S50). When the other-vehicle EFI 3 is previously removed from the used vehicle and prepared for replacement prior to removing the own-vehicle EFI3 and TCU 4 from the own vehicle, the time information stored in the EEPROM 8 of the other-vehicle EFI 3 is earlier than the time information stored in the EEPROM 33 of the own-vehicle TCU 4.

Thus, the microcomputer 7 determines NO in step S50 and determines that the TCU identification number is a correct identification number (S55). Then, the microcomputer 7 writes the TCU identification number into the storage area for the EFI identification number (S56). Accordingly, it is possible to determine that the TCU identification number written in the EEPROM 33 of the TCU 4 is correct and identify the TCU 4 as the target electronic control device that stores the correct vehicle identification number therein. Further, it is also possible to write the TCU identification number into the EFI 3 replaced from the other vehicle as the EFI identification number. Accordingly, even when the own-vehicle EFI 3 is replaced with the other-vehicle EFI 3, it is possible to correctly rewrite the vehicle identification number VIN.

As described above, according to the present embodiment, it is possible to identify an electronic control device that stores a correct vehicle identification number VIN therein. Further, it is possible to identify the correct identification number VIN and writes the correct identification number VIN into another electronic device. Thus, it is possible to prevent different vehicle identification numbers VIN from being stored in the EEPROMs 8, 33 of the EFI 3 and the TCU 4.

(Second Embodiment)

Figure 6:
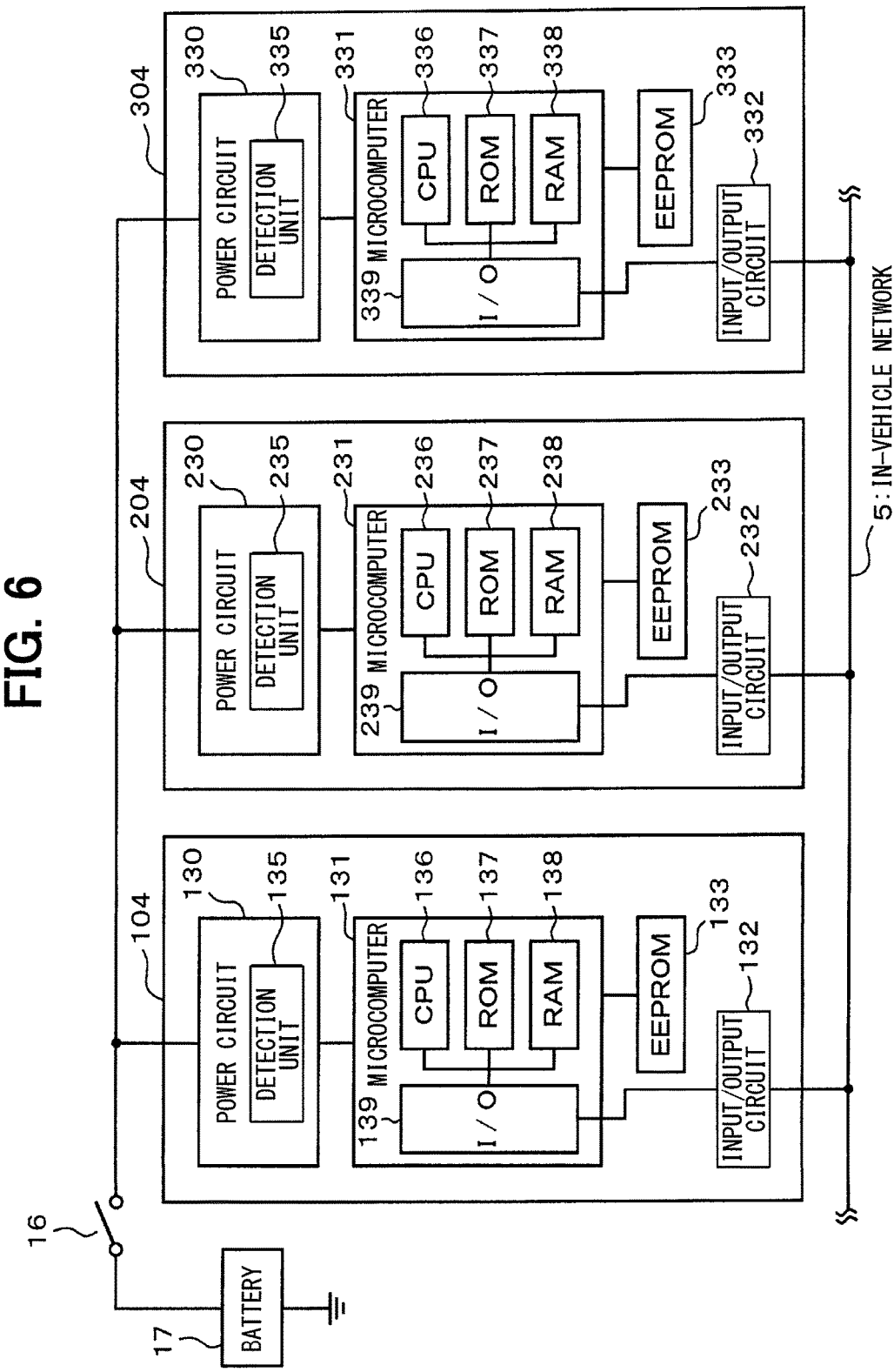
FIG. 6 is a block diagram schematically illustrating a connection form between a plurality of electronic control devices in a second embodiment.

FIG. 6 is an additional explanatory diagram of a second embodiment. As illustrated in FIG. 6, a plurality of electronic control devices are not limited to the EFI 3 and the TCU4. The present disclosure can also be applied to a system in which electronic control devices 104, 204, 304 other than the EFI 3 and the TCU 4 are connected to each other.

In FIG. 6, the electronic control device 104 is provided with a power circuit 130, a microcomputer 131, an input/output circuit 132, and an EEPROM 133. The electronic control device 204 is also provided with a power circuit 230, a microcomputer 231, an input/output circuit 232, and an EEPROM 233. Further, the electronic control device 304 is also provided with a power circuit 330, a microcomputer 331, an input/output circuit 332, and an EEPROM 333. The microcomputers 131, 231, 331 have a function similar to the function of the microcomputers 7, 31 of the above embodiment. The EEPROMs 133, 233, 333 have a function similar to the function of the EEPROMs 8, 33 of the above embodiment. The electronic control devices 104, 204, 304 have similar configurations. Thus, the internal configuration of the electronic control device 104 will be described, and description for the internal configurations of the electronic control devices 204, 304 will be omitted by attaching a sign whose hundreds place is changed from the sign attached to each internal configuration of the electronic control device 104.

The microcomputer 131 inside the electronic control device 104 is provided with a CPU 136, a ROM 137, a RAM 138, and an I/O 139. The power circuit 130 is provided with a detection unit 135. The input/output circuit 132 is connected to the I/O 139 and connected to a vehicle network 5.

The detection unit 135 of the power circuit 130 detects voltage of the battery 17 through a key switch 16. The microcomputer 131 determines whether the voltage of the battery 17 detected by the detection unit 135 has dropped below a predetermined voltage. Then, when the microcomputer 131 determines that the voltage of the battery 17 has dropped below the predetermined voltage, the microcomputer 131 turns off an ECU effective flag and stores time information in the EEPROM 133. The ECU effective flag is, for example, flag information that is stored in the EEPROM 133 or the RAM 138 inside the electronic control device 104. Although these processes are also performed in the electronic control devices 204, 304 in a similar manner, description thereof will be omitted. Details of this operation are similar to the details illustrated in FIGS. 2 and 3.

Further, the microcomputer 131 performs processing whose details are similar to the details illustrated in FIGS. 4 and 5 described in the first embodiment. That is, when the microcomputer 131 detects that the key switch 16 has been turned on, the microcomputer 131 determines whether identification numbers VIN stored in the EEPROMs of all the electronic control devices 104, 204, 304 match.

When any one of the electronic control devices 104, 204, 304 stores a different identification number VIN therein, the microcomputer 131 checks the ECU effective flag of the identification number VIN and determines that the electronic control device (any of 104, 204, 304) in which the ECU effective flag is ON is a target electronic control device that stores the correct identification number therein. Then, the microcomputer 131 writes the identification number VIN stored in the EEPROM of the target electronic control device into the EEPROMs of the other electronic control devices.

Further, when the microcomputer 131 determines that all the ECU effective flags are OFF, the microcomputer 131 determines that the electronic control device (any of 104, 204, 304) that stores the newest time information therein is the target electronic control device and determines that the identification number VIN stored in the EEPROM of the target electronic control device is the correct identification number. Then, the microcomputer 131 writes the identification number VIN in the EEPROM (any of 133, 233, 333) of the target electronic control device (any of 104, 204, 304) that is determined to store the correct identification number VIN therein into the EEPROMs of all the other electronic control devices. Accordingly, even if an electronic control device is replaced, it is possible to identify an electronic control device that stores a correct identification number VIN therein and write the correct identification number VIN into the EEPROM of the replaced electronic control device. Although a mode in which the microcomputer 131 mainly performs processing has been described, the microcomputers 231, 331 may mainly perform processing.

As described above, also in the configuration in which three or more electronic control devices 104, 204, 304 are combined, effects similar to the effects of the above embodiment are achieved.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle electronic control device that is connected to an other electronic control device to constitute a system, the vehicle electronic control device comprising:
   a detection unit that detects a power supply voltage supplied to a body of the electronic control device;
   a power determination unit that determines whether the power supply voltage detected by the detection unit is reduced below a predetermined voltage;
   an identification number storage unit that stores a vehicle identification number;
   a timing storage unit that stores time information of reduction in a nonvolatile manner when the power determination unit determines that the power supply voltage is reduced below the predetermined voltage;
   a control unit that acquires a vehicle identification number stored in an identification number storage unit of the other electronic control device and time information stored in a timing storage unit of the other electronic control device through a vehicle network; and
   an identification number determination unit that: determines one of the other electronic control device and the electronic control device as a target electronic control device when the timing storage unit of each of the other electronic control device and the electronic control device stores the time information, the one of the other electronic control device and the electronic control device storing newest time information in the timing storage unit; and determines that a vehicle identification number stored in the identification number storage unit of the target electronic control device is a correct identification number.

2. A vehicle electronic control device that is connected to an other electronic control device to constitute a system, the vehicle electronic control device comprising:
   a detection unit that detects a power supply voltage supplied to a body of the electronic control device;
   a power determination unit that determines whether the power supply voltage detected by the detection unit is reduced below a predetermined voltage;
   an identification number storage unit that stores a vehicle identification number;
   a determination result storage unit that stores a determination result of the power determination unit;
   a control unit that acquires a vehicle identification number stored in an identification number storage unit of the other electronic control device through a vehicle network; and
   an identification number determination unit that: determines one of the other electronic control device and the electronic control device a target electronic control device, the one of the other electronic control device and the electronic control device storing information, in the determination result storage unit, indicating that the power supply voltage is not reduced below the predetermined voltage; and determines that a vehicle identification number stored in the identification number storage unit of the target electronic control device is a correct identification number.

3. The vehicle electronic control device according to claim 1, further comprising:
 a rewriting unit that writes the vehicle identification number, determined by the identification number determination unit as the correct identification number, into the identification number storage unit of an other of the other electronic control device and the electronic control device different from the target electronic control device.

4. The vehicle electronic control device according to claim 2, further comprising:
 a rewriting unit that writes the vehicle identification number, determined by the identification number determination unit as the correct identification number, into the identification number storage unit of an other of the other electronic control device and the electronic control device different from the target electronic control device.

* * * * *